(12) United States Patent
Feng et al.

(10) Patent No.: US 11,181,736 B2
(45) Date of Patent: Nov. 23, 2021

(54) LENS MODULE CAPABLE OF REDUCING FLARE AND ELECTRONIC DEVICE USING THE SAME

(71) Applicant: HON HAI PRECISION INDUSTRY CO., LTD., New Taipei (TW)

(72) Inventors: Ya-Lan Feng, New Taipei (TW); Chun-Cheng Ko, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 135 days.

(21) Appl. No.: 16/743,205

(22) Filed: Jan. 15, 2020

(65) Prior Publication Data

US 2020/0409142 A1    Dec. 31, 2020

(30) Foreign Application Priority Data

Jun. 25, 2019  (CN) .......................... 201910557289.X

(51) Int. Cl.
*G02B 9/00* (2006.01)
*G02B 27/00* (2006.01)
*G02B 7/02* (2021.01)

(52) U.S. Cl.
CPC ......... *G02B 27/0018* (2013.01); *G02B 7/021* (2013.01)

(58) Field of Classification Search
CPC .... G02B 27/0018; G02B 7/021; G02B 5/005; G02B 13/001; G02B 7/026; G02B 13/0015; G03B 30/00; H04N 5/2254

USPC .......................................................... 359/738
See application file for complete search history.

(56) References Cited

U.S. PATENT DOCUMENTS 9,829,609 B2 * 11/2017 Chou ..................... G02B 7/021
2012/0188648 A1    7/2012 Lai et al.

FOREIGN PATENT DOCUMENTS

| CN | 104880806 A | 9/2015 |
| TW | 201232144 A1 | 8/2012 |
| TW | 201416788 A | 5/2014 |

* cited by examiner

*Primary Examiner* — James C. Jones
(74) *Attorney, Agent, or Firm* — ScienBiziP, P.C.

(57) ABSTRACT

A lens module capable of reducing flare includes a lens cone, a lens group, and a light-shielding sheet group. The lens group comprises a plurality of lenses formed from an object side of the lens module to an image side of the lens module. The light-shielding sheet group comprises a plurality of light-shielding sheets. The plurality of light-shielding sheets is embedded between each adjacent two lenses of the plurality of lenses. A difference value between an inner diameter of the lens cone corresponding to a first light shielding sheets arranged from the image side to the object side and an outer diameter of the first light shielding sheets arranged from the image side to the object side is greater than 0.01 mm and less than 0.02 mm. The disclosure also relates to an electronic device.

14 Claims, 4 Drawing Sheets

LENS MODULE CAPABLE OF REDUCING FLARE AND ELECTRONIC DEVICE USING THE SAME

FIELD

The subject matter of the application generally relates to a lens module.

BACKGROUND

Electronic devices, such as mobile phones, tablet computers or cameras, may have lens modules. The lens module includes at least one lens. An error or a defect of the lens causes flare on the image. Thus, at least one light-shielding sheet is needed to avoid the glare. The light-shielding sheet may be installed in the lens module through a fixing component. If an outer diameter of the light-shielding sheet is too large, the light-shielding sheet is easily folded. Thus, a space is generated between the light-shielding sheet and the fixing component, which causes the light shielding sheet to be unstably installed in the lens module. The light-shielding sheet is shifted, which causes line glare on the image.

Therefore, there is room for improvement in the art.

BRIEF DESCRIPTION OF THE DRAWINGS

Implementations of the present disclosure will now be described, by way of embodiments, with reference to the attached figures.

DETAILED DESCRIPTION

Figure 1:
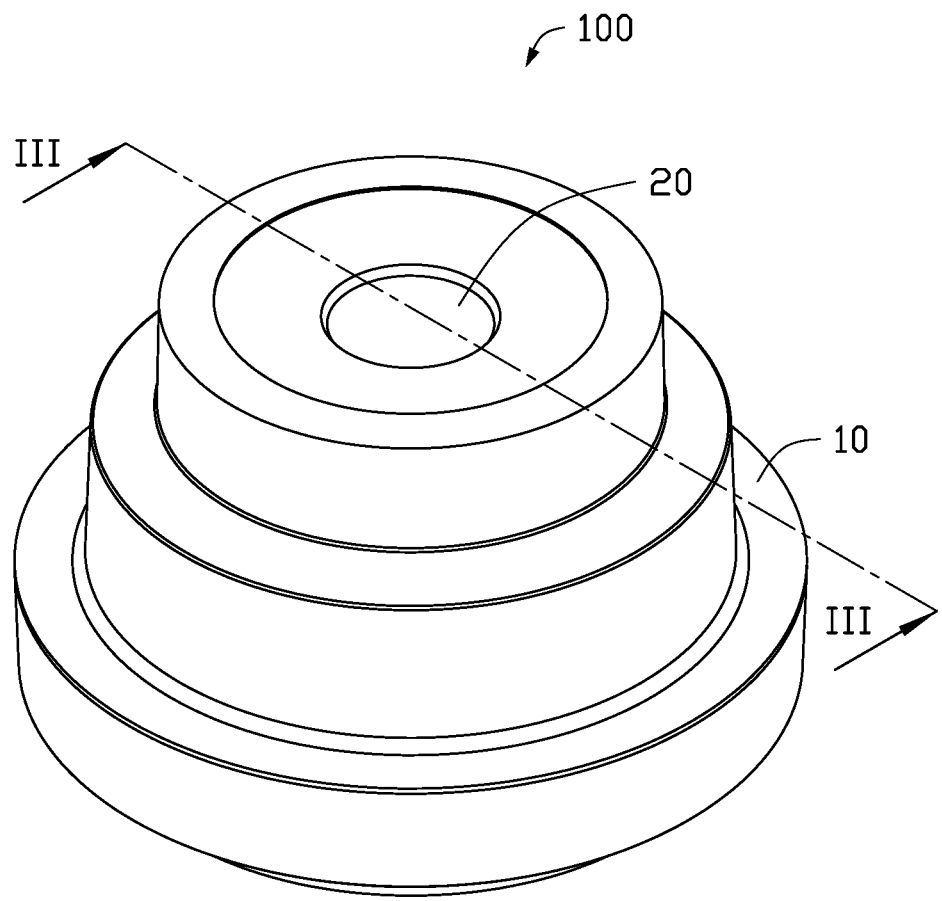
FIG. 1 is a perspective view of a first embodiment of a lens module according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain portions may be exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

The term "comprising" when utilized, means "including, but not necessarily limited to"; it specifically indicates open-ended inclusion or membership in the so-described combination, group, series, and the like.

Figure 2:
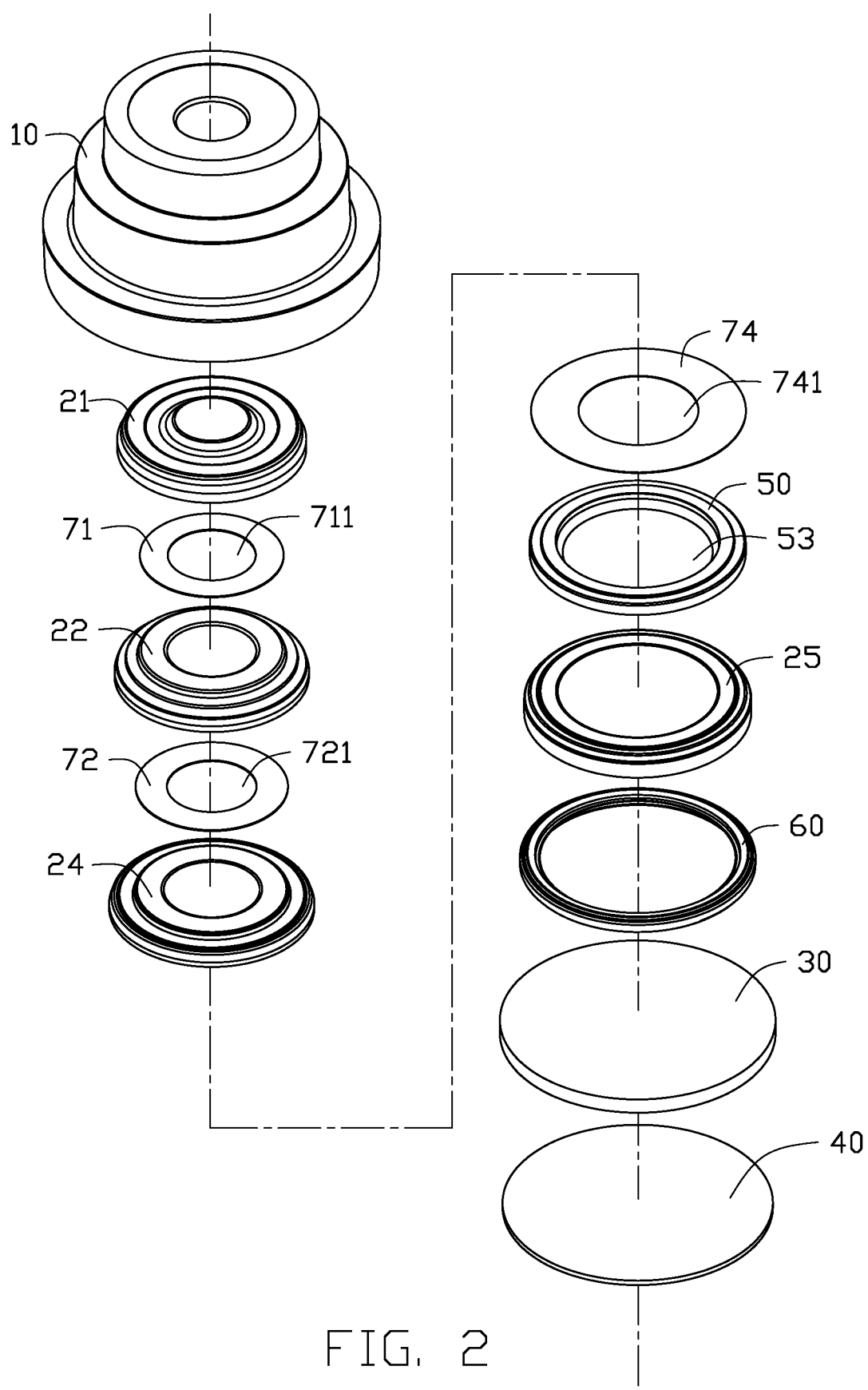
FIG. 2 is an exploded view of the lens module of FIG. 1.
Figure 3:
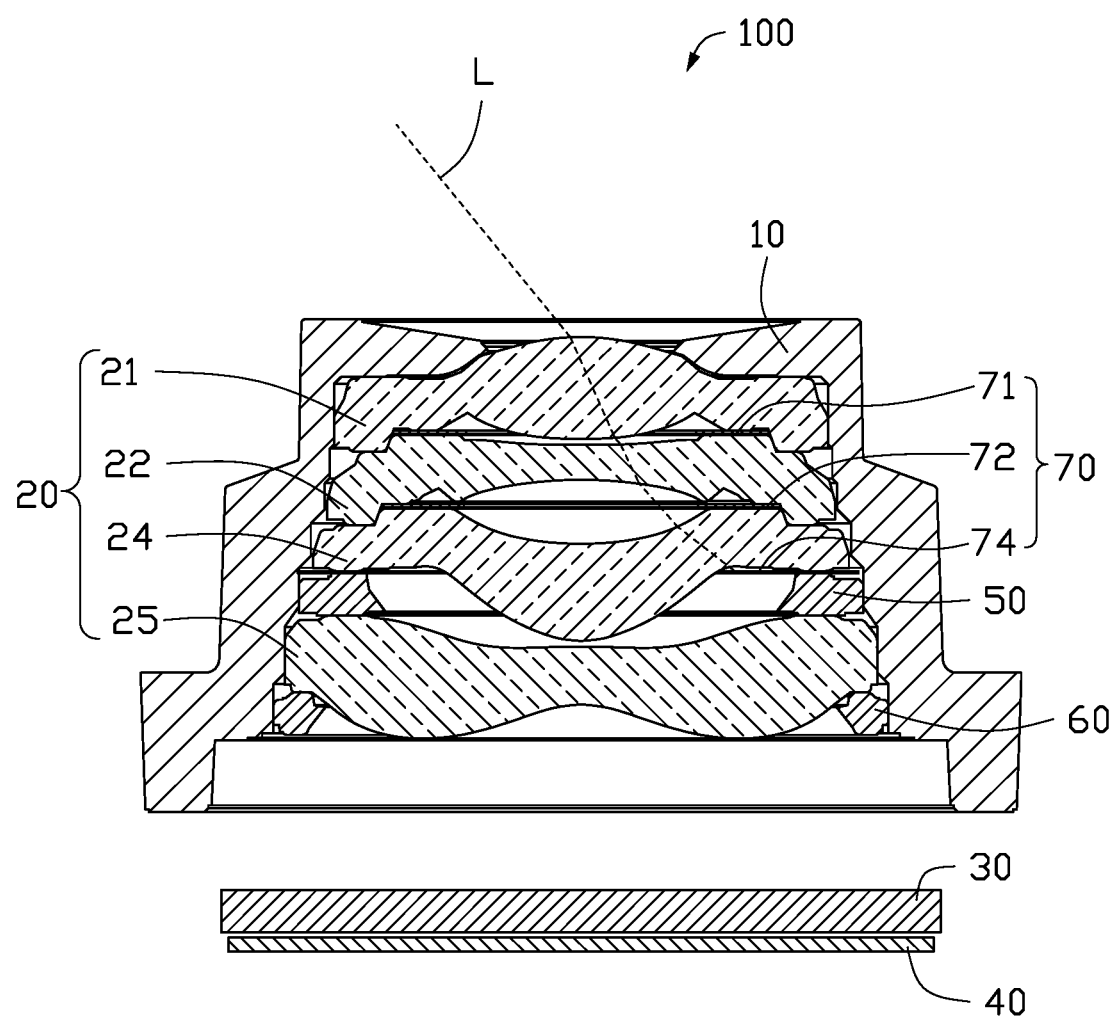
FIG. 3 is a cross-section view along a line of FIG. 1.

FIGS. 1-3 show an embodiment of a lens module 100. The lens module 100 includes a lens cone 10, a lens group 20, a filter 30, a sensor 40, a gasket 50, a stopper 60, and a light-shielding sheet group 70.

The lens group 20, the filter 30, and the sensor 40 are sequentially arranged from an object side of the lens module 100 to an image side of the lens module 100. The lens group 20 is fixed in the lens cone 10. The filter 30 is formed on the sensor 40 and faces the lens group 20. The sensor 40 faces the lens group 20, too.

The lens group 20 includes a plurality of lenses arranged successively from an object side of the lens module 100 to an image side of the lens module 100. The gasket 50 is formed between two adjacent lenses of the lens group 20 from the image side to the object side. The stopper 60 is formed behind one of the plurality of lenses on the image side and fixed in the lens cone 10 to stop the lens group 20 from sliding out of the lens cone 10. The light-shielding sheet group 70 includes a plurality of light-shielding sheets. Some of the plurality of light-shielding sheets are respectively embedded between each adjacent two lenses of the plurality of lenses, and last one of the plurality of light-shielding sheets from the object side to the image side is formed between a penultimate lens of the plurality of lenses from the object side to the image and the gasket 50.

In at least one embodiment, the lens group 20 includes a first lens 21, a second lens 22, a third lens 24, and a fourth lens 25. The first lens 21, the second lens 22, the third lens 24, and the fourth lens 25 are sequentially mounted in the lens cone 10 from the object side to the image side.

In at least one embodiment, the gasket 50 is formed between the third lens 24 and the fourth lens 25 to maintain an air gap between the third lens 24 and the fourth lens 25. An inner hole 53 is defined in a middle of the gasket 50. The inner hole 53 transmits light. The inner hole 53 has an aperture that increases progressively from the object side to the image side.

In at least one embodiment, the stopper 60 is closed to the fourth lens 25 and fixed in the lens cone 10 to stop the lens group 20 from sliding out of the lens barrel 10. A size of an outer diameter of the stopper 60 matches that of the inner wall of the lens cone 10 to meet a size of an air gap of the optical design.

In at least one embodiment, the light-shielding sheet group 70 includes a first light-shielding sheet 71, a second light-shielding sheet 72, and a third light-shielding sheet 74. The first light-shielding sheet 71, the second light-shielding sheet 72, and the third light-shielding sheet 74 are sequentially mounted in the lens cone 10 from the object side to the image side. The first light-shielding sheet 71 is mounted between the first lens 21 and the second lens 22. The second light-shielding sheet 72 is mounted between the second lens 22 and the third lens 24. The third light-shielding sheet 74 is mounted between the third lens 24 and the gasket 50.

A first through hole 711 is defined in a middle of the first light-shielding sheet 71. A second through hole 721 is defined in a middle of the second light-shielding sheet 72. A third through hole 741 is defined in a middle of the third light-shielding sheet 74.

Defining an outer diameter of the third light-shielding sheet 74 is $D_1$, an inner diameter of the lens cone 10 corresponding to the third light-shielding sheet 74 is $D_2$.

In at least one embodiment, the $D_1$ and $D_2$ satisfy a following relationship: $0.01 \text{ mm} < D_2 - D_1 < 0.02 \text{ mm}$. Furthermore, $D_2 = 4.022$ mm, $D_1 = 4.005$ mm.

In other embodiments, the number of lenses of the lens group 20 is not limited to four, and the number of the light shielding sheets is not limited to three, as long as a difference value between an inner diameter of the lens cone corresponding to one of the light shielding sheets arranged on the image side and an outer diameter of the light shielding sheet arranged on the image side is greater than 0.01 mm and less than 0.02 mm.

In at least one embodiment, materials of the first light-shielding sheet 71, the second light-shielding sheet 72, and the third light-shielding sheet 74 are a Soma light-shielding material.

Referring to FIG. 3, when some incident lights L passes through the first lens 21 and the second lens 22 and shoots on the third lens 24, the incident lights L be blocked by the third light-shielding sheet 74.

Figure 4:
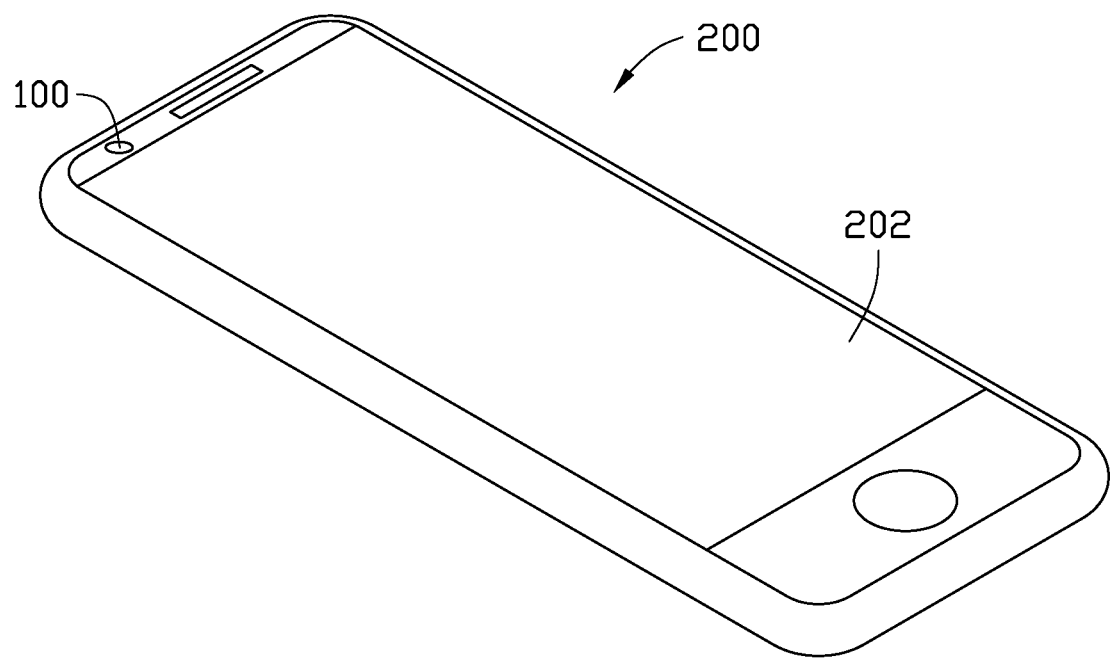
FIG. 4 is a perspective view of an electronic device.

FIG. 4 shows an embodiment of an electronic device 200. The electronic device 200 includes a body 202 and the lens module 100 mounted in the body 202. The electronic device 200 may be a smart phone, a tablet computer, or the like. In at least one embodiment, the electronic device 200 is a smart phone.

With the embodiments described above, the lens module 100 has a difference value between an inner diameter of the lens cone corresponding to a first light shielding sheets arranged from the image side to the object side and an outer diameter of the first light shielding sheets arranged from the object side to the image side that is greater than 0.01 mm and less than 0.02 mm to prevent light-shielding sheet from being folded and make the light shielding sheet be stably installed in the lens module, thereby improving image quality of the lens module.

The embodiments shown and described above are only examples. Many details are often found in the art such as the other features of a lens module and an electronic device using the lens module. Therefore, many such details are neither shown nor described. Even though numerous characteristics and advantages of the present disclosure have been positioned forth in the foregoing description, together with details of the structure and function of the present disclosure, the disclosure is illustrative only, and changes can be made in the detail, including in matters of shape, size, and arrangement of the parts within the principles of the present disclosure, up to and including the full extent established by the broad general meaning of the terms used in the claims. It will therefore be appreciated that the embodiments described above can be modified within the scope of the claims.

What is claimed is:

1. A lens module comprising:
a lens cone;
a lens group, wherein the lens group comprises a plurality of lenses formed from an object side of the lens module to an image side of the lens module; and
a light-shielding sheet group, wherein the light-shielding sheet group comprises a plurality of light-shielding sheets; the plurality of light-shielding sheets is embedded between each adjacent two lenses of the plurality of lenses; and
wherein a difference value between an inner diameter of the lens cone corresponding to one of the plurality of light shielding sheets arranged on the image side and an outer diameter of the light shielding sheet arranged on the image side is greater than 0.01 mm and less than 0.02 mm.

2. The lens module of claim 1, further comprising a gasket, wherein the gasket is formed between last two of the plurality of lenses from the object side to the image side; wherein last one of the plurality of light-shielding sheets from the object side to the image side is formed between a penultimate lens of the plurality of lenses from the object side to the image side and the gasket.

3. The lens module of claim 1, wherein further comprising a stopper closed to last one of the plurality of lenses from the object side to the image side and fixed in the lens cone.

4. The lens module of claim 1, further comprising a filter and a sensor; wherein:
the lens group, the filter, and the sensor are sequentially arranged from the object side to the image side;
the lens group is fixed in the lens cone;
the filter is formed on the sensor and faces the lens group; and
the sensor faces the lens group.

5. The lens module of claim 2, wherein the lens group comprises a first lens, a second lens, a third lens, and a fourth lens sequentially mounted in the lens cone from the object side to the image side; the gasket is formed between the third lens and the fourth lens.

6. The lens module of claim 5, wherein the light-shielding sheet group comprises a first light-shielding sheet, a second light-shielding sheet, and a third light-shielding sequentially mounted in the lens cone from the object side to the image side; the third light-shielding sheet is located on the image side; the first light-shielding sheet is mounted between the first lens and the second lens; the second light-shielding sheet is mounted between the second lens and the third lens; and the third light-shielding sheet is mounted between the third lens and the gasket.

7. The lens module of claim 6, wherein the third light-shielding sheet has an outer diameter $D_1$; wherein the lens cone has an inner diameter $D_2$ corresponding to the third light-shielding sheet; wherein the $D_1$ and $D_2$ satisfy a following relationship: $0.01 \text{ mm} < D_2 - D_1 < 0.02 \text{ mm}$.

8. An electronic device, comprising:
a body; and
a lens module mounted in the body comprising:
a lens cone;
a lens group, wherein the lens group comprises a plurality of lenses formed from an object side of the lens module to an image side of the lens module; and
a light-shielding sheet group, wherein the light-shielding sheet group comprises a plurality of light-shielding sheets; the plurality of light-shielding sheets is embedded between each adjacent two lenses of the plurality of lenses; and
wherein a difference value between an inner diameter of the lens cone corresponding to one of the plurality of light shielding sheets arranged on the image side and an outer diameter of the light shielding sheet arranged on the image side is greater than 0.01 mm and less than 0.02 mm.

9. The electronic device of claim 8, wherein the lens module further comprises a gasket, the gasket is formed between last two of the plurality of lenses from the object side to the image side; last one of the plurality of light-shielding sheets from the object side to the image side is formed between a penultimate lens of the plurality of lenses from the object side to the image and the gasket.

10. The electronic device of claim 8, wherein the lens module further comprises a stopper closed to last one of the plurality of lenses from the object side to the image side and fixed in the lens cone.

11. The electronic device of claim 8, wherein the lens module further comprises a filter and a sensor; wherein the lens group, the filter, and the sensor are sequentially arranged from the object side to the image side; the lens group is fixed in the lens cone; the filter is formed on the sensor and faces the lens group; and the sensor faces the lens group.

12. The electronic device of claim 9, wherein the lens group comprises a first lens, a second lens, a third lens, and a fourth lens sequentially mounted in the lens cone from the object side to the image side; the gasket is formed between the third lens and the fourth lens.

13. The electronic device of claim 12, wherein the light-shielding sheet group comprises a first light-shielding sheet, a second light-shielding sheet, and a third light-shielding sequentially mounted in the lens cone from the object side to the image side; the third light-shielding sheet is located on the image side; the first light-shielding sheet is mounted between the first lens and the second lens; the second light-shielding sheet is mounted between the second lens and the third lens; the third light-shielding sheet is mounted between the third lens and the gasket; and the third light-shielding sheet is located on the image side.

14. The electronic device of claim 13, wherein the third light-shielding sheet has an outer diameter $D_1$; wherein the lens cone has an inner diameter $D_2$ corresponding to the third light-shielding sheet; wherein the $D_1$ and $D_2$ satisfy a following relationship: $0.01$ mm$<D_2-D_1<0.02$ mm.

* * * * *